United States Patent Office 3,034,959
Patented May 15, 1962

3,034,959
HALOGENATED PROPANE INHALATION ANESTHETIC MIXTURES
Kenneth T. Dishart, Wilmington, Del., assignor to E. I. du Pont de Nemours and Company, Wilmington, Del., a corporation of Delaware
No Drawing. Filed Mar. 14, 1961, Ser. No. 95,501
8 Claims. (Cl. 167—52)

This invention relates to new inhalation anesthetic mixtures which consist essentially of oxygen and 3-bromo-1,1,2,2-tetrafluoropropane as the anesthetic.

It is recognized in the art that no single inhalation anesthetic has all of the qualities desired in a general purpose anesthetic. The inhalation anesthetics commonly employed heretofore have various undesirable properties. Ethyl ether and cyclopropane create fire and explosive hazards in the operating room. The post-operative nausea that too often follows the use of ether is disagreeable and troublesome. Cyclopropane has such a high vapor pressure at ordinary room temperature that it must be transported and kept in heavy cylinders. Chloroform is nonflammable and storable in light containers, but it sometimes produces serious heart and liver damage, particularly when the ventilation during anesthesia, induced and maintained with it, is inadequate. Nitrous oxide is relatively harmless but it supports combustion and is only a mild anesthetic; high concentrations of the gas being needed to induce anesthesia, and the state of insensitivity is neither deep nor prolonged. Considerable research has been conducted in attempts to discover inhalation anesthetics which do not have such undesirable properties.

It is known that a number of organic fluorine compounds have anesthetic properties. While some of these do not have the undesirable properties of the common inhalation anesthetics, nearly all of them have other undesirable properties, such as high toxicity, hydrolytic instability, reactivity with soda-lime, insufficient effectiveness in reasonable concentrations, insufficient margin of safety, and most producing undesirable physiological side effects. B. H. Robbins in J. Pharmacology and Experimental Therapeutics, 86, 197–204 (1946) reports the results of tests with some 46 fluorine compounds. Of these, only 18 were considered to show sufficient promise to warrant testing on other than mice, and only 4 produced results such that it was felt that further investigations thereof were indicated. Amongst the compounds tested were $CHF_2CH_2Cl$ and $CHF_2CH_2Br$. The $CHF_2CH_2Cl$ was tested on mice but apparently was not considered to show sufficient promise for testing on other animals. The $CHF_2CH_2Br$ was tested on dogs but was found to render the animals rigid, to produce convulsions, and to result in cardiac arrhythmia.

Up to the present time, one organic fluorine compound has been accepted as being suitable for clinical use as an inhalation anesthetic. Such compound is 2-bromo-2-chloro-1,1,1-trifluorethane which is sold under the trade name "Fluothane." Such compound is a comparatively new, very potent, nonflammable anesthetic. The effective concentration varies from about 1% to less than 3.5% with surgical anethesia being induced within 5 to 7 minutes with concentrations of 2% to 2.5% and maintained with concentrations of 0.8% to 1%. It is sold with the caution that it does not permit a wide margin of error, and sudden exposure to relatively high concentrations can lead to profound hypotension with cardiac arrest, whereby the accurate and proper administration of it is mandatory and it should be used only in vaporizers that have been calibrated accurately to permit concentrations that may be altered in fractions of 0.1 percent over a clinical range of 0.5 percent to 3.5 percent and under the control of a trained anesthetist. It is pointed out that during induction a short but definite excitement period is usually present unless premedication is administered, a diminution of respiratory exchange develops and usually persists, and hypotension of variable degree is common, according to the depth of anesthesia. In general, muscle relaxation adequate for major surgical procedures is obtained only at anesthetic levels where a hypotension of some severity may occur.

It is an object of this invention to provide an inhalation anesthetic mixture in which the anesthetic has a more complete combination of the desirable properties of an inhalation anesthetic than is possessed by commonly known anesthetics. A more particular object is to provide an inhalation anesthetic that smoothly and readily induces deep anesthesia, is nonflammable in the mixtures with oxygen which are normally employed, has a wide safety margin, and is free from untoward physiological effects. Other objects are to provide new compositions of matter and to advance the art. Still other objects will appear hereinafter.

The above and other objects may be accomplished in accord with this invention which involves an inhalation anesthetic mixture consisting essentially of oxygen and 3-bromo-1,1,2,2-tetrafluoropropane, the oxygen being present in a proportional amount proper for respiratory purposes, and mixtures thereof with nitrous oxide.

It has been found that 3-bromo-1,1,2,2-tetrafluoropropane, having the formula $HCF_2CF_2CH_2Br$, is especially well adapted for use as an inhalation anesthetic because it smoothly and readily induces a deep anesthesia and its vapor, in concentrations within the anesthetic range, has a pleasant and non-irritating odor. This compound is non-flammable in air and in oxygen in the proportions used for clinical anesthesia. It is unaffected by soda-lime under the conditions of use in an anesthetic machine. In concentrations that produce anesthesia satisfactory for surgical purposes, the compound does not cause convulsions in mice and dogs. The 3-bromo-1,1,2,2-tetrafluoropropane has a particularly wide margin of safe working concentrations, high anesthetic activity, freedom from fire and explosive hazards, and exhibits relatively few adverse side effects. It may be administered by various machine techniques with a wide margin of safety and has been observed to produce no pronounced change in respiratory rate or blood pressure in dogs until very deep levels of anesthesia were reached and maintained with it.

The anesthetic compound of this invention is administered by inhalation with a mixture of oxygen supplied as pure oxygen or as air in life supporting quantities. The anesthetic is vaporized and mixed with oxygen before it is administered or it is mixed during administration to provide the desired proportion of anesthetic and oxygen in the lungs. The respirable, gaseous anesthetic composition contains sufficient anesthetic agent to produce the desired depth of anesthesia and sufficient oxygen to sustain life. The concentrations of the anesthetic in the mixture may be varied in accordance with the requirements of the surgical procedure during anesthesia. The 3-bromo-1,1,2,2-tetrafluoropropane is compatible chemically with other known anesthetics such as ether, nitrous oxide, cyclopropane, and 2-bromo-2-chloro-1,1,1-trifluoroethane; and such other anesthetics may be employed in combination with the 3-bromo-1,1,2,2-tetrafluoropropane, if desired. The use of nitrous oxide with the 3-bromo-1,1,2,2-tetrafluoropropane adds to the analgesic quality of the total anesthetic mixture. When so used, the nitrous oxide usually will constitute from about 25% to about 50% by volume of the mixture. The other known anesthetics do not appear to introduce any particular advantage when used with 3-bromo-1,1,2,2-tetrafluoropropane.

The particular procedure or technique selected for administering the inhalation anesthetic of this invention will depend upon such conditions and circumstances as the preference of the anesthetist, the needs of the surgical treatment involved and the equipment that is available. Preferably, the anesthetic will be administered by a calibrated closed circuit anesthetizing machine in which the vapors of the anesthetic are confined and administered in a controlled atmosphere which is maintained by the machine and applied through a facemask device.

The usual premedicants such as barbiturates, meperidine, morphine, scopolamine appear to be compatible with 3-bromo-1,1,2,2-tetrafluoropropane, and may be prescribed for use with it. Epinephrine and norepinephrine, however, are incompatible with the anesthetic of this invention as they are with other halogenated inhalation anesthetics. In the place of these drugs, methedrine, methoxamine, and neosynephrine can be used safely to counteract excessive hypotension, if it should occur, and to constrict blood vessels during operating procedures.

Usually, an inhalation anesthetic is administered at a concentration higher than that needed to maintain anesthesia in order to give a pleasant and rapid induction into a full surgical stage of anesthesia. The initial concentration is then reduced to the maintenance level when the desired stage of anesthesia is reached. It is desirable that an inhalation anesthetic be sufficiently potent so that it can be used in a low concentration in oxygen for induction into anesthesia and for maintenance of the anesthesia, but the anesthetic should not be so potent that the effective concentrations will be so low as to create difficulty in metering the anesthetic. Also, the upper limit to which the anesthetic concentration may be taken without danger to the respiration and heart action should be high enough to leave a wide margin of safety in its use.

With 3-bromo-1,1,2,2-tetrafluoropropane, a concentration of from about 6% to about 7% by volume in oxygen or air induces a surgical depth of anesthesia in dogs. Such level is readily maintained with concentrations of from about 4% to about 5% by volume. Concentrations in excess of 8% have been used without immediate fatality.

The 3-bromo-1,1,2,2-tetrafluoropropane may be considered to be a member of a series of compounds, the members of which differ from the adjacent members by a —$CF_2$— group, which series may be represented by the formula $H(CF_2)_nCH_2Br$ wherein $n$ represents an integer. Not all members of such series are known. Of those that are known, none, other than the compound of this invention, has been found suitable as inhalation anesthetics. For example, the compounds of formula $H(CF_2)_4CH_2Cl$ and $H(CF_2)_4CH_2Br$ cause convulsions in mice when used in inhalation anesthetic mixtures. The compounds in which $n$ is 6 or higher have too low a vapor pressure at ordinary room temperatures to function as inhalation anesthetics. The next lower homologue, 2-bromo-1,1-difluoroethane ($n=1$) having the formula $HCF_2CH_2Br$, is unsuitable as an inhalation anesthetic because, when it was so used on dogs, it rendered them rigid, produced convulsions and resulted in cardiac arrhythmia as disclosed by Robbins in J. Pharmacology and Experimental Therapeutics, 86, pp. 197–204 (1946), see particularly page 202.

Robbins (loc. cit.) also tested 2-chloro-1,1-difluoroethane ($n=1$) having the formula $HCF_2CH_2Cl$ as an inhalation anesthetic on mice and found that it had an AD 50 value (the dose in volume percent in an air atmosphere required to induce anesthesia in 50% of the mice upon ten minutes exposure) of 2.15% and an FD 50 value (the dose in volume percent that caused death in 50% of the mice in ten minutes) of 7.5 (page 198), but apparently did not consider it to show sufficient promise to warrant testing it with dogs or other animals. On the other hand, as shown hereinafter in Example 1 hereof, 3-bromo-1,1,2,2-tetrafluoropropane has an AD 50 in mice of 0.5%. Thus, the anesthetic dose (AD) of $HCF_2CH_2Cl$ is at least 4 times that for 3-bromo-1,1,2,2-tetrafluoropropane.

Also, it has been found that 3-chloro-1,1,2,2-tetrafluoropropane has anesthetic properties. However, its use for such purposes has frequently resulted in cardiac arrhythmias, as disclosed by Drs. Fabian, Carnes and De Witt in "Anesthesia and Analgesia," vol. 39, No. 5, September-October 1960, pages 456–462, whereby it is considered to be unsafe and is not recommended for use as an anesthetic for human beings or commercially valuable animals.

The 3-bromo-1,1,2,2-tetrafluoropropane has been employed successfully by a plurality of physicians as the inhalation anesthetic agent on human beings in over 50 clinical cases involving both male and female patients ranging in age from 21 years to 66 years. The duration of the anesthetic periods were from 1 to 4.5 hours. Some of the surgical procedures performed included exploratory laparotomy, inguinal herniorrhaphy, sigmoid polypectomy, appendectomy, vaginal hysterectomy and vein stripping. None of these patients had previous histories of a serious nature, relative to the cardio-vascular or pulmonary systems.

The concentrations of 3-bromo-1,1,2,2-tetrafluoropropane used on human beings were 1.5% to 2.4% by volume for inducing a surgical depth of anesthesia and from 0.5% to 1% by volume for maintaining a surgical level of anesthesia. The induction of anesthesia in humans with 3-bromo-1,1,2,2-tetrafluoropropane is smooth and relatively rapid (averaging 5–10 minutes); an excitement stage is passed through without difficulty. Recovery of the patients from the anesthesia is also rapid, all being wide awake and alert within 20 minutes after the application of the anesthesia is discontinued. Each of the patients appeared to have a degree of euphoria on awakening. There has been no incidence of post-operative nausea or of respiratory irritation.

It has been found further that 3-bromo-1,1,2,2-tetrafluoropropane produces pronounced muscle relaxation in human beings at the first plane of the third stage of anesthesia, and it is rarely necessary to go to the deeper levels of anesthesia or to use muscle relaxation drugs. Also, there is a near absence of capillary oozing. This results in substantially ideal operating conditions for the surgeon. The muscle relaxation effect of 3-bromo-1,1,2,2-tetrafluoropropane at such a level of anesthesia is unique among inhalation anesthetics. With prior known inhalation anesthetics, it is generally necessary to use deeper levels of anesthesia in order to achieve the muscle relaxation required for surgery, particularly in the chest and abdominal regions. When it is hazardous to use such deeper anesthesia with the other anesthetics owing to adverse side effects produced thereby, special muscle relaxant drugs must be used. The use of 3-bromo-1,1,2,2-tetrafluoropropane as an anesthetic for human beings is virtually free from cardiac arrhythmia and other effects on the heart. It is also relatively free from respiratory depression and hypotension problems in lighter anesthetic planes. These are distinctly important advantages of 3-bromo-1,1,2,2-tetrafluoropropane.

Also, the margin of safety, defined as the difference between the mean concentration of anesthetic that produces respiratory arrest and the mean concentration for maintenance of anesthesia at the second plane of the third stage in human beings, for 3-bromo-1,1,2,2-tetrafluoropropane is greater than 4% and is surprising and outstanding among halogen-containing anesthetics. Representative values of the defined margin of safety are:

| Anesthetic | Mean Concentration for Respiratory Arrest on Continuous Administration, in percent [1] | Mean Concentration for Anesthetic Maintenance, in percent [1] (Second plane of third stage) | Margin of Safety, in percent Concentration |
|---|---|---|---|
| | A | B | A−B |
| 3-Bromo-1,1,2,2-tetrafluoropropane | >5 | 1 | >4 |
| 2-Bromo-2-chloro-1,1,1-trifluoroethane | 2 | 1 | 1 |
| Ethyl ether | 7 | 4 | 3 |
| Chloroform | 2 | 1.5 | 0.5 |
| Cyclopropane | 37 | 16 | 24 |

[1] The percentage values are in terms of the composition of the respiratory atmosphere.

The margins of safety for ether, chloroform and cyclopropane are based upon known characteristics of these anesthetics. In the case of ethyl ether, the induction concentration is in the range of 10% to 12%, the maintenance anesthetic range is 3% to 5% for second plane of third stage anesthesia, and respiratory arrest is produced following continuous administration of 6% to 8% vapor concentrations. In the case of chloroform, induction concentration is about 4%, maintenance is 1.35% to 1.65%, and respiratory arrest is produced following continuous administration of a 2% vapor concentration. In the case of cyclopropane, induction of anesthesia is obtained with concentrations of 40% to 50%, maintenance concentrations are 8% to 12% for first plane anesthesia and 12% to 20% for second plane anesthesia, and respiratory arrest may be produced after continuous administration of a 35% to 39% concentration. Collins, V. J., Anesthesiology, Lea and Febiger and Co. 1952, Philadelphia; and Adriani, John, The Pharmacology of Anesthetic Drugs, Charles C. Thomas Co., 3rd edition, 1st printing, 1952, Springfield, Illinois.

In order to more clearly illustrate this invention, preferred modes of carrying it into effect and the advantageous results obtained thereby, the following examples are given in which the proportions are by volume except where specifically indicated otherwise.

EXAMPLE 1

*Tests on Mice*

3-bromo-1,1,2,2-tetrafluoropropane causes a rapid and smooth induction of mice into anesthesia with complete relaxation followed by a rapid and uneventful recovery. The dose inducing anesthesia in half the animals under test during 10 minutes' exposure (AD 50) is:

| Agent | AD 50, vol. percent in air |
|---|---|
| 3-Bromo-1,1,2,2-tetrafluoropropane | 0.5 |

The apparatus used for the test consisted of a 3.8 liter wide-mouth jar which was rotated on its side at 14 r.p.m. Two mice were placed in the jar, and the anesthetic was injected with a hypodermic needle through a rubber dam closure of the jar and allowed to volatilize within the jar. The liquid volumes of the injected anesthetic to give known vapor volume percentage concentrations in the air within the jar were precalculated. During the test, an animal is considered to be anesthetized when it is unable to maintain an upright position and rolls over continuously for 15 seconds. The test procedure was adopted from that described by Robbins in J. Pharmacology and Experimental Therapeutics, 86, 197 (1946). When $CHF_2CF_2CF_2CH_2Cl$ and $$CHF_2CF_2CF_2CF_2CH_2Br$$

were tested on mice, they caused violent convulsions and hence are not at all suitable for use as anesthetics.

EXAMPLE 2

*Anesthesia in Dog*

A dog was anesthetized with 3-bromo-1,1,2,2-tetrafluoropropane in oxygen, using a closed circuit anesthetizing machine. The vaporizer for the anesthetic was a type used for ether anesthesia. By regulating the bubbling of oxygen through the liquid anesthetic, a controlled amount of anesthetic vapor was introduced into the anesthetizing atmosphere. Some relations between the flow of oxygen and the concentration of anesthetic administered to the animal were:

| Flow of oxygen through vaporizer, in cc. per min. | Concentration of 3-bromo-1,1,2,2-tetrafluoropropane administered to animal, percent by vol. of respired atmosphere [1] |
|---|---|
| 50 | 1.8 |
| 100 | 2.8 |
| 150 | 3.7 |
| 200 | 4.5 |
| 300 | 6.1 |
| 400 | 7.0 |
| 600 | 8.5 |

[1] The respired atmosphere consisted of the oxygen passed through the vaporizer, the anesthetic vapor mixed with this oxygen stream, and 400 cc. per min. of oxygen which by-passed the vaporizer.

The physiological responses of the dog were observed and measured throughout the period of anesthesia. The blood pressure, respiration, heart activity by an electrocardiograph, and mental activity by an electroencephalograph were continuously and simultaneously recorded.

Induction into anesthesia was rapid with no observable side effects. With a concentration of 4.5% to 6.1% by volume of the anesthetic in the respirable atmosphere of the anesthetic, a surgical level of anesthesia was attained (1st and 2nd planes of the 3rd stage of anesthesia) and such level was maintained with a concentration of 4.5% to 6.1%, with little change in respiratory rate or blood pressure. There was little indication of respiratory depression, with an adequate rate and depth of respiration prevailing even at the 3rd plane of anesthesia. Hypotension was no problem except at excessively deep levels of anesthesia of the 3rd plane and lower, and even under these conditions it was not severe. Neither the rate nor the rhythm of the heart beat showed any induced abnormalities. There were no convulsions during the anesthesia or during recovery therefrom. With a maintenance concentration of 6.1% to 8.5% of the anesthetic, the deepest levels of anesthesia (3rd and 4th planes of the 3rd stage) were reached without any immediate fatal effect.

Recovery from anesthesia with the 3-bromo-1,1,2,2-tetrafluoropropane was rapid and free from side effects. On flushing the dog's respiratory system with oxygen, when the animal was in a 4th plane state of anesthesia, the dog returned in five to ten minutes to a 1st plane state of anesthesia with normal blood pressure and respiration and regained in about five more minutes a waking type respiration and brain activity.

This difference of about 4 percent between the concentration required to maintain a level of anesthesia generally suitable for operating purposes and the concentration that brings about the deepest level of anesthesia represents a wide margin of safety in the use of the anesthetic. Anesthetic machines are capable of controlling the concentration of the anesthetic to within 0.1 of a percent or less. If, through some failure of the machine or mishandling by an anesthetist, the concentration of the 3-bromo-1,1,2,2-tetrafluoropropane anesthetic is momentarily increased, say, by 1% to 4%, no damage is done.

3-bromo-1,1,2,2-tetrafluoropropane was also successfully administered as an anesthetic to a dog by the open drop technique, that is, by dripping the anesthetic as needed onto an absorbent cone held over the dog's nose.

EXAMPLE 3

*Effect of Anesthetic on Respiration and Blood Pressure*

A dog was anesthetized with 3-bromo-1,1,2,2-tetrafluoropropane in oxygen as described in Example 2. At the surgical level of anesthesia, the dog displayed no pronounced respiratory depression or hypotension. At the excessively deep levels of anesthesia only, were respiration and blood pressure significantly depressed. When respiratory arrest occurred after an extended exposure to a 7% concentration of the anesthetic, the animal was kept at an extreme depth of anesthesia for a period up to seven minutes by manual control of its respiration. When the animal was returned to the surgical level of anesthesia, its blood pressure and respiration were normal, and no untoward effects developed while the animal remained under anesthesia and recovered therefrom.

EXAMPLE 4

*Pathological Effect of 3-Bromo-1,1,2,2-Tetrafluoropropane*

Eight additional dogs were anesthetized with 3-bromo-1,1,2,2-tetrafluoropropane in oxygen as described in Example 2 keeping each animal at the second to the third plane of the third stage of anesthesia (a level of anesthesia deeper than the surgical maintenance level) for two hours of each of six consecutive days employing 4.5% to 6.1% concentration of the anesthetic in oxygen. At the end of the sixth day's anesthesia, the animals were sacrificed by administering an 8.5% dosage of the anesthetic for 10 minutes to 20 minutes, and examined for pathological effects. Microscopic examination of the tissues from the dogs showed no abnormalities. Sections were taken from the lungs, the liver, spleen, kidneys, and the adrenal gland.

EXAMPLE 5

*Mixture of 3-Bromo-1,1,2,2-Tetrafluoropropane and Nitrous Oxide*

A dog was anesthetized as in Example 2 except that the by-pass flow of oxygen was replaced by a 50–50 mixture by volume of oxygen and nitrous oxide. The overall effects on the animal were the same as described in Example 2, except that the nitrous oxide improved the analgesic quality of the total anesthesia mixture. By this is meant that the animal more quiety underwent induction into anesthesia when the nitrous oxide was used.

EXAMPLE 6

*Anesthesia in Humans with 3-Bromo-1,1,2,2-Tetrafluoropropane*

3-bromo-1,1,2,2-tetrafluoropropane was administered as the anesthetic to a 27-year-old colored male who was scheduled to undergo an interval appendectomy. As premedication, the patent received nembutal 100 mgms. and atropine 0.6 mgm. The anesthetic was administered in a partial rebreathing circuit under a Foregger Copper Kettle vaporizer and anesthetic machine.

The induction concentration was 2.0% of 3-bromo-1,1,2,2-tetrafluoropropane in mixture with nitrous oxide (2 lit./min.) and oxygen (2 lit./min.). Anesthesia was maintained at a first plane of third stage anesthesia using a vapor concentration of 1.9% of 3-bromo-1,1,2,2-tetrafluoropropane.

Respiratory rate, following the introduction of anesthesia, was 22 per minute but was controlled at a rate of 20 per minute throughout the remainder of the procedure.

No cardiac arrhythmias were noted and the maximum drop in blood pressure after 90 minutes of anesthesia was 30 millimeters. The procedure lasted for 2 hours and 45 minutes during which time no supplementary anesthetic or muscle relaxant drug was used.

Following discontinuation of the anesthetic, the blood pressure returned to the control level immediately and within 15 minutes the patient was awake and alert and there was no complaint of nausea.

There were no postanesthetic or postoperative complications.

EXAMPLE 7

3-bromo-1,1,2,2-tetrafluoropropane was administered as the anesthetic to a 41 year old, colored male who was scheduled to undergo a vein stripping of the right leg for varicose veins. As premedication, the patient received nembutal 100 mgs. and atropine 0.6 mgm. The anesthetic was administered in a partial rebreathing circuit under a Foregger Copper Kettle vaporizer and anesthetic machine.

The induction concentration was 2.0% of 3-bromo-1,1,2,2-tetrafluoropropane in mixture with nitrous oxide (2 lit./min.) and oxygen (2 lit./min.). Anesthesia was maintained at a first plane of third stage anesthesia using a vapor concentration of 1.9% of 3-bromo-1,1,2,2-tetrafluoropropane. The anesthesia was administered for 86 minutes during which time no supplementary anesthetic or muscle relaxant drug was used.

Respiratory rate following the induction of anesthesia was 22 to 30 per minute and spontaneous respiration was maintained throughout the procedure. There were no cardiac arrhythmias, no decrease in blood pressure and the respiration was maintained well.

Following discontinuation of the anesthetic, the patient was awake and alert without nausea within 15 minutes. No complications were noted throughout the postoperative period.

EXAMPLE 8

*Stability to Alkali*

3-bromo-1,1,2,2-tetrafluoropropane (also 3-chloro-1,1,2,2-tetrafluoropropane) is unaffected by, and hence is compatible with, the soda-lime used to absorb carbon dioxide from the required atmosphere under the conditions employed in a closed circuit anesthetic apparatus. Repeated contact of the 3-bromo-1,1,2,2-tetrafluoropropane with soda-lime in anesthetic experiments with dogs has failed to show any adverse effect on the animals that could be attributed to a decomposition of the anesthetic caused by the soda-lime. Also, samples of the anesthetic, isolated from the respired atmosphere and analyzed by high resolution gas chromatography, showed no decomposition products.

In rigorous tests with strong caustic solution, some hydrogen fluoride splits out, but a relatively high resistance to the action of caustic is shown by the 3-bromo-1,1,2,2-tetrafluoropropane of this invention. After shaking 3-bromo-1,1,2,2-tetrafluoropropane with 10% sodium hydroxide solution in closed tubes at 80° C. for 20 hours, more than 50% of the amount of the original compound withstood the action of the caustic solution and was recovered. 3-chloro-1,1,2,2-tetrafluoropropane is similarly resistant to attack by strong caustic solution.

The 3-bromo-1,1,2,2-tetrafluoropropane anesthetic compound of this invention, and 3-chloro-1,1,2,2-tetrafluoropropane, are new compounds which are disclosed and claimed by Werner V. Cohen in his copending application Serial No. 4,593, filed January 26, 1960, which discloses some methods for preparing them, and other utilities thereof. Also, such compounds may be readily prepared by reacting 2,2,3,3-tetrafluoropropyl p-toluenesulfonate with potassium chloride or potassium bromide as outlined below.

Preparation of 2,2,3,3-Tetrafluoropropyl p-Toluenesulfonate

Following the procedure of Tiers et al. set forth in JACS 75, 5978 (1953), 2,2,3,3-tetrafluoropropyl p-toluenesulfonate was prepared using 2,2,3,3-tetrafluoro-1-propanol made as described by Joyce in Patent 2,559,628. The physical properties and results of chemical analysis of the product are:

M.P. 14–16° C., B.P. 131° C. at 3 mm., $n_D^{20}=1.4600$.
Calculated for $C_{10}H_{10}F_4O_3S$: C—41.96%, H—3.5%, F—26.6%, S—11.2%. Found: C—41.9%, H—3.6%, F—26.0%, S—11.0%.

Preparation of 3-Bromo-(and 3-Chloro-)1,1,2,2-Tetrafluoropropane

Following the procedure of Faurote et al. set forth in JACS 78, 4999 (1956), these compounds were prepared by reacting 2,2,3,3-tetrafluoropropyl p-toluenesulfonate with an appropriate potassium halide. The physical properties and results of chemical analysis of the products are:

|  | B.p., °C., at 760 | Sp. gr., 20/4 | $n_D^{25}$ | Chemical analysis, percent | |
|---|---|---|---|---|---|
|  |  |  |  | Calculated | Found |
| $HCF_2CF_2CH_2Br$ | 74 | 1.81 | 1.3558 | Br, 41.01 | 40.3 |
| $HCF_2CF_2CH_2Cl$ | 55 | 1.43 | 1.3218 | Cl, 23.58 | 23.4 |

Purification

To provide anesthetic-quality 3-bromo-1,1,2,2-tetrafluoropropane, the impurities were reduced to less than 10 p.p.m., as determined by gas chromatography, by efficient fractional distillation and passage through columns of alumina activated by heating in an air oven at 200° C. for four hours.

It will be understood that the preceding examples have been given for illustrative purposes solely and that this invention is not restricted to the specific embodiments described therein. On the other hand, it will be apparent to those skilled in the art that, subject to the limitations set forth in the general description, variations can be made in the concentrations of the inhalation mixtures and in the techniques employed without departing from the spirit and scope of this invention.

From the preceding description, it will be apparent that this invention provides new and valuable inhalation anesthetic mixtures which have many advantages over the inhalation anesthetics employed heretofore. Inhalation mixtures which contain 3-bromo-1,1,2,2-tetrafluoropropane as the anesthetic are particularly valuable as they do not have the disadvantageous properties of the prior common anesthetics and have material advantages thereover, especially in the wide margin of safety in the effective concentrations employed and in the absence of adverse side effects obtained in their use.

This is a continuation-in-part of my prior copending applications Serial No. 834,941, filed August 20, 1959, now abandoned, and Serial No. 9,455, filed February 18, 1960, now abandoned.

The embodiments of the invention in which an exclusive property or privilege is claimed are defined as follows:

1. An inhalation anesthetic mixture consisting essentially of oxygen and 3-bromo-1,1,2,2-tetrafluoropropane, the oxygen being present in a proportional amount proper for respiratory purposes.

2. An inhalation anesthetic mixture consisting essentially of oxygen, nitrous oxide and 3-bromo-1,1,2,2-tetrafluoropropane, the oxygen being present in a proportional amount proper for respiratory purposes.

3. A respirable gaseous anesthetic mixture consisting essentially of oxygen and from about 0.5% to about 5% by volume of 3-bromo-1,1,2,2-tetrafluoropropane.

4. A respirable gaseous anesthetic mixture consisting essentially of oxygen and from about 0.5% to about 2.4% by volume of 3-bromo-1,1,2,2-tetrafluoropropane.

5. A respirable gaseous anesthetic mixture consisting essentially of 3-bromo-1,1,2,2-tetrafluoropropane in about a 50/50 volume mixture of oxygen and nitrous oxide.

6. A respirable gaseous anesthetic mixture consisting essentially of from about 0.5% to about 2.4% by volume of 3-bromo-1,1,2,2-tetrafluoropropane in about a 50/50 volume mixture of oxygen and nitrous oxide.

7. A respirable gaseous anesthetic mixture for dogs consisting essentially of oxygen and from about 4% to about 8% by volume of 3-bromo-1,1,2,2-tetrafluoropropane.

8. A respirable gaseous anesthetic mixture for dogs consisting essentially of oxygen, nitrous oxide and from about 4% to about 8% by volume of 3-bromo-1,1,2,2-tetrafluoropropane.

No references cited.

UNITED STATES PATENT OFFICE
CERTIFICATE OF CORRECTION

Patent No. 3,034,959                          May 15, 1962

Kenneth T. Dishart

It is hereby certified that error appears in the above numbered patent requiring correction and that the said Letters Patent should read as corrected below.

Column 1, line 61, for "anethesia" read -- anesthesia --; column 7, line 52, for "quiety" read -- quietly --; line 72, for "introduction" read -- induction --; column 8, line 18, for "100 mgs." read -- 100 mgms. --; column 8, between lines 38 and 39, insert the following:

EXAMPLE 8

Mixtures of 3-bromo-1,1,2,2-tetrafluoropropane in all proportions in air are nonflammable. Also, mixtures of 3-bromo-1,1,2,2-tetrafluoropropane at concentrations of 6.9% by volume and below in oxygen are nonflammable, but at concentrations of 7% to 53% by volume in oxygen are flammable. The flammability of 3-bromo-1,1,2,2-tetrafluoropropane in air and in oxygen was determined as follows:

A 1 litre spherical mixing and ignition vessel, and auxiliary material measuring and transferring equipment, were heated with thermostatic control in a water bath at 35° C. The mixing vessel was evacuated and pressurized to 1 atmosphere with various proportions of 3-bromo-1,1,2,2-tetrafluoropropane and air or oxygen. The components were thoroughly mixed by means of a laboratory magnetic stirrer, and the temperature of the mixture was allowed to come to 35° C. Then, ignition of the mixture was attempted with an instantaneous capacitance spark having an energy of 10 joules.

The 3-bromo-1,1,2,2-tetrafluoropropane exhibits no flash point up to 74° C., its boiling point, as determined by the standard open-cup flash point determination method.

same column 8, line 39, for "EXAMPLE 8" read -- EXAMPLE 9 --; same column, line 45, for "required" read -- respired --; column 9, in the table, heading to the second column thereof, after "760" insert -- mm. --.

Signed and sealed this 28th day of August 1962.

(SEAL)
Attest:

ESTON G. JOHNSON                          DAVID L. LADD
Attesting Officer                       Commissioner of Patents